United States Patent [19]

Angeli

[11] Patent Number: 5,322,905
[45] Date of Patent: Jun. 21, 1994

[54] STABLE BLENDS OF COPOLYETHERIMIDE ESTER THERMOPLASTIC ELASTOMERS AND POLYAMIDES

[75] Inventor: Stephen R. Angeli, Washington, W. Va.

[73] Assignee: General Electric Company, Pittsfield, Mass.

[21] Appl. No.: 661,168

[22] Filed: Feb. 27, 1991

[51] Int. Cl.$^5$ ................................. C08L 77/00
[52] U.S. Cl. ........................... 525/403; 525/432; 524/155; 524/186; 524/351; 524/423; 524/538; 524/357
[58] Field of Search .............. 524/155, 186, 351, 423, 524/538, 357; 525/403, 432

[56] References Cited

U.S. PATENT DOCUMENTS

| | | | |
|---|---|---|---|
| 3,896,078 | 7/1975 | Hoeschele | 524/258 |
| 4,504,632 | 3/1985 | Holub et al. | 525/432 |
| 4,556,705 | 12/1985 | McCready | 528/289 |
| 4,579,773 | 4/1986 | Cole et al. | 428/260 |
| 4,639,486 | 1/1987 | Liu | 525/423 |
| 4,659,765 | 4/1987 | Liu et al. | 524/447 |
| 4,755,585 | 7/1988 | Hanson et al. | 528/182 |
| 4,788,249 | 11/1988 | Maresca et al. | 525/66 |
| 4,892,901 | 6/1990 | Liu | 525/423 |
| 4,923,924 | 5/1990 | Grant et al. | 525/66 |

*Primary Examiner*—John Kight, III
*Assistant Examiner*—R. Johnson

[57] ABSTRACT

Blends of copolyetherimide ester resin and amorphous or crystalline nylon provide thermoplastic elastomers having improved thermal aging performance. Optionally, various stabilizers, fillers and rubber modifiers can be added to the thermoplastic elastomer blend to further stabilize the blends to heat, oxidation and UV light.

46 Claims, 2 Drawing Sheets

STABLE BLENDS OF COPOLYETHERIMIDE ESTER THERMOPLASTIC ELASTOMERS AND POLYAMIDES

BACKGROUND OF THE INVENTION

The present invention relates to novel thermoplastic elastomers which have improved thermal aging performance. More specifically, this invention relates to blends of copolyetherimide esters and polyamides ("nylons") which exhibit increased thermal aging performance when compared to the copolyetherimide ester resin alone.

Copolyetherimide esters are well known and have been described in a number of patents and publications such as U.S. Pat. Nos. 4,556,705 and 4,659,765 both assigned to the General Electric Company. These copolyetherimide esters are based on low molecular weight diols, dicarboxylic acids and polyoxyalkylene diimide diesters, and exhibit a variety of advantageous properties. These compositions are commercially available from the General Electric Company under the Lomod ® tradename.

Copolyetherimide ester thermoplastics are suitable for the internal components of microwave ovens, electrical and electronic products, automotive, appliance and aerospace/transportation applications especially where temperatures above 120° C. and up to about 180° C. are often encountered. In general, thermoplastic elastomers exposed to such high temperatures over periods of time tend to undergo oxidative degradation, whereupon they no longer provide optimal properties. U.S. Pat. No. 3,896,078 discloses a blend of a copolyether ester with polyamides reportedly having greatly enhanced resistance toward oxidative degradation, in particular degradation at temperatures of about 120° C. to 200° C.

Although there are thermoplastic elastomers that can withstand high temperatures, there is still a need to improve the thermal aging performance in copolyetherimide ester compositions.

SUMMARY OF THE INVENTION

It has now been discovered that novel and improved thermoplastic copolyetherimide ester compositions having improved thermal aging performance can be prepared. The present invention provides a stable thermoplastic elastomer composition comprising a blend of
(A) a copolyetherimide ester composition comprising the reaction product of
  (I) one or more low molecular weight diols;
  (II) one or more dicarboxylic acids;
  (III) a reactant selected from
    (a)(i) at least one high molecular weight poly(oxyalkylene) diamine and
    (ii) at least one tricarboxylic acid; or
    (b) at least one high molecular weight poly(oxyalkylene) diimide diacid; and
(B) one or more polyamides.

The copolyetherimide esters (A) which comprise the novel thermoplastic elastomers of the present invention can be either random or block (but preferably are random) copolymers and are prepared by conventional processes from the reactants (I)–(III) mentioned above. Reactant (III) can be comprised of the diamine and tricarboxylic acid components per se, such that the diimide diacid forms in situ in the overall reaction mixture. In the alternative, the diamine and tricarboxylic acid may be pre-reacted and thus provided in the final reaction mixture as the poly(oxyalkylene) diimide diacid.

Optionally, poly(oxyalkylene) glycol units (IV) can be present as a co-reactant with components (I), (II) and (III) to form copolyetherimide esters (A) having modified stress-strain properties, melting temperatures and flexibility.

The compositions of this invention typically also include one or more stabilizers (C) and, optionally, one or more fillers (D) or rubbery modifiers (E).

The polyamides (B) employed are classified as crystalline or amorphous nylons. These nylons are prepared by conventional processes known in the art. The copolyetherimide ester and the polyamide are blended together using the various blending methods practiced in the art. The resulting thermoplastic elastomer exhibits increased thermal aging performance over the copolyetherimide ester resin alone.

DETAILED DESCRIPTION OF THE PREFERRED EMBODIMENTS

The copolyetherimide ester component of the present invention can be regarded as consisting essentially of a multiplicity of recurring intra-linear long chain polyoxyalkylene diimide diacid units ("soft blocks"), short chain ester units ("hard blocks") and optionally poly(oxyalkylene) units (also considered "softblocks") connected head-to-tail through ester linkages. The diimide diacid units (III)(b) are defined as reaction products of a polyoxyalkylene diamine (III)(a)(i) and a tricarboxylic acid component (III)(a)(ii). The short chain ester units are reaction products of a dicarboxylic acid (II) and a low molecular weight diol (I). Alternatively poly(oxyalkylene) units (IV) can be reacted with components (I), (II) and (III) to form copolyetherimide esters having modified stress-strain properties, melting temperatures and flexibility.

Preferred compositions encompassed by the present invention may be prepared from (I) one or more $C_2$–$C_{15}$ aliphatic and/or cycloaliphatic diols, (II) one or more $C_4$–$C_{16}$ aliphatic, cycloaliphatic and/or aromatic dicarboxylic acids or ester derivatives thereof, (III) one or more polyoxyalkylene diimide diacids and blending these compositions with appropriate amounts of amorphous or crystalline polyamides (B) or mixtures thereof. The amount of polyoxyalkylene diimide diacid employed is generally dependent upon the desired properties of the resultant copolyetherimide ester. In general, the weight ratio of polyoxyalkylene diimide diacid (III) to dicarboxylic acid (II) is from about 0.20 to 2.5, preferably from about 0.25 to about 2.0.

The compositions of this invention preferably contain stabilizers (C) and, optionally, fillers (D). The choice of particular fillers and stabilizers will be made by the artisan based on the contemplated end use of the elastomer.

Suitable diols (I) for use in preparing the compositions of the present invention include saturated and unsaturated aliphatic and cycloaliphatic dihydroxy compounds as well as aromatic dihydroxy compounds. These diols are preferably of a low molecular weight, i.e. having a molecular weight of about 250 or less. When used herein, the term "diols" and "low molecular weight diols" should be construed to include equivalent ester forming derivatives thereof, provided, however, that the molecular weight requirement pertains to the diol only and not to its derivatives. Exemplary of ester forming derivatives are the acetates of the diols as well as for example ethylene oxide or ethylene carbonate for ethylene glycol.

Preferred saturated and unsaturated aliphatic and cycloaliphatic diols are those having from 2 to about 15 carbon atoms. Exemplary of these diols are ethyleneglycol, propanediol, butanediol, pentanediol, 2-methyl propanediol, 2,2-dimethyl propanediol, hexanediol, decanediol, 1,2-, 1,3- and 1,4-dihydroxy cyclohexane; 1,2-, 1,3- and 1,4-cyclohexane dimethanol; butene diol; hexene diol, etc. Especially preferred are 1,4-butanediol and mixtures thereof with hexanediol or butenediol, most preferably 1,4-butanediol. Aromatic diols suitable for use in the practice of the present invention are generally those having from 6 to about 15 carbon atoms. Included among the aromatic dihydroxy compounds are resorcinol, hydroquinone, 1,5-dihydroxy naphthalene, 4,4'-dihydroxy diphenyl, bis(p-hydroxy phenyl)methane and bis(p-hydroxy phenyl) 2,2-propane.

Especially preferred diols are the saturated aliphatic diols, mixtures thereof and mixtures of a saturated diol(s) with an unsaturated diol(s), wherein each diol contains from 2 to about 8 carbon atoms. Where more than one diol is employed, it is preferred that at least about 60 mole %, based on the total diol content, be the same diol, most preferably at least 80 mole %. As mentioned above, the preferred compositions are those in which 1,4-butanediol is present in a predominant amount, most preferably when 1,4-butanediol is the only diol.

Dicarboxylic acids (II) which are suitable for use in the practice of the present invention are aliphatic, cycloaliphatic and/or aromatic dicarboxylic acids. These acids are preferably of a low molecular weight, i.e., having a molecular weight of less than about 300; however, higher molecular weight dicarboxylic acids, especially dimer acids, also may be used. The term "dicarboxylic acids" as used throughout this specification and claims, includes equivalents of dicarboxylic acids having two functional carboxyl groups which perform substantially like dicarboxylic acids in reaction with glycols and diols in forming polyester polymers. These equivalents include esters and ester-forming derivatives, such as acid halides and anhydrides. The molecular weight preference, mentioned above, pertains to the acid and not to its equivalent ester or ester-forming derivative. Thus, an ester of a dicarboxylic acid having a molecular weight greater than 300 or an acid equivalent of a dicarboxylic acid having a molecular weight greater than 300 are included provided the acid has a molecular weight below about 300. Additionally, the dicarboxylic acids may contain any substituent group(s) or combinations which do not substantially interfere with the polymer formation and use of the polymer of this invention.

Unless otherwise noted, the term "molecular weight" and the abbreviation MW refer to number average molecular weight.

Aliphatic dicarboxylic acids, as the term is used herein, refers to carboxylic acids having two carboxyl groups each of which is attached to a saturated carbon atom. Preferred aliphatic dicarboxylic acids have from about 4 to about 16 carbon atoms. If the carbon atom to which the carboxyl group is attached is saturated and is in a ring, the acid is cycloaliphatic.

Aromatic dicarboxylic acids, as the term is used herein, are dicarboxylic acids having two carboxyl groups each of which is attached to a carbon atom in an isolated or fused benzene ring system. Preferred aromatic dicarboxylic acids have from about 6 to about 16 carbon atoms. It is not necessary that both functional carboxyl groups be attached to the same aromatic ring and where more than one ring is present, they can be joined by aliphatic or aromatic divalent radicals or divalent radicals such as —O— or —$SO_2$—.

Representative aliphatic and cycloaliphatic acids which can be used for this invention are sebacic acid, 1,2-cyclohexane dicarboxylic acid, 1,3-cyclohexane dicarboxylic acid, 1,4-cyclohexane dicarboxylic acid, adipic acid, glutaric acid, succinic acid, oxalic acid, azelaic acid, diethylmalonic acid, allylmalonic acid, dimer acid, 4-cyclohexene-1,2-dicarboxylic acid, 2-ethylsuberic acid, tetramethylsuccinic acid, cyclopentanedicarboxylic acid, decahydro-1,5-naphthalene dicarboxylic acid, 4,4'-bicyclohexyl dicarboxylic acid, decahydro-2,6-naphthalene dicarboxylic acid, 4,4 methylenebis(cyclohexane carboxylic acid), 3,4-furan dicarboxylic acid and 1,1-cyclobutane dicarboxylic acid. Most preferred aliphatic acids are cyclohexane dicarboxylic acids, sebacic acid, dimer acid, glutaric acid, azelaic acid and adipic acid.

Representative aromatic dicarboxylic acids which can be used include terephthalic, phthalic and isophthalic acids, bi-benzoic acid, substituted dicarboxy compounds with two benzene nuclei such as bis(p-carboxyphenyl) methane, oxybis(benzoic acid), ethylene-1,2-bis-(p-oxybenzoic acid), 1,5-naphthalene dicarboxylic acid, 2,6-naphthalene dicarboxylic acid, 2,7-naphthalene dicarboxylic acid, phenanthrene dicarboxylic acid, anthracene dicarboxylic acid, 4,4'-sulfonyl dibenzoic acid, and halo and $C_1$-$C_{12}$ alkyl, alkoxy, and aryl ring substitution derivatives thereof. Hydroxy acids such as p($\beta$-hydroxyethoxy)benzoic acid can also be used provided an aromatic dicarboxylic acid is also present.

Preferred dicarboxylic acids for the preparation of the copolyetherimide esters of the present invention are the aromatic dicarboxylic acids, mixtures thereof and mixtures of one or more dicarboxylic acid with an aliphatic and/or cycloaliphatic dicarboxylic acid, most preferably the aromatic dicarboxylic acids. Among the aromatic acids, those with 8–16 carbon atoms are most preferred, particularly the benzene dicarboxylic acids, i.e., phthalic, terephthalic and isophthalic acids and their dimethyl derivatives. Especially preferred is dimethyl terephthalate.

Finally, where mixtures of dicarboxylic acids are employed in the practice of the present invention, it is preferred that at least about 60 mole %, preferably at least about 80 mole %, based on 100 mole % of dicarboxylic acid (II) be of the same dicarboxylic acid or ester derivative thereof. As mentioned above, the preferred compositions are those in which dimethylteraphthalate is the predominant dicarboxylic acid, most preferably when dimethylterephthalate is the only dicarboxylic acid.

Polyoxyalkylene diimide diacids (III)(b) suitable for use herein are high molecular weight diimide diacids wherein the average molecular weight is greater than about 700, most preferably greater than about 900. They may be prepared by the iridization reaction of one or more tricarboxylic acid compounds (ii) containing two vicinal carboxyl groups or an anhydride group and an additional carboxyl group which must be esterifiable and preferably is non-imidizable with a high molecular weight polyoxylalkylene diamine. These polyoxyalkylene diimide diacids and processes for their preparation are per se known. See, for example, U.S. Pat. Nos. 4,661,582, 4,594,377 and 4,544,734.

In general, the polyoxyalkylene diimide diacids useful herein may be characterized by the following formula:

wherein each R is independently a trivalent organic radical, preferably a $C_2$ to $C_{20}$ aliphatic, aromatic or cycloaliphatic trivalent organic radical; each R' is independently hydrogen or a monovalent organic radical preferably selected from the group consisting of $C_1$ to $C_6$ aliphatic and cycloaliphatic radicals and $C_6$ to $C_{10}$ aromatic radicals, e.g. benzyl, most preferably hydrogen; and G is the radical remaining after the removal of the terminal (or as nearly terminal as possible) hydroxy groups of a long chain ether glycol having an average molecular weight of from about 600 to about 12000, preferably from about 900 to about 4000, and a carbon-to-oxygen ratio of from about 1.8:1 to about 4.3:1.

The polyoxyalkylene diamines (III)(a)(i) suitable for use in the present invention are characterized by the formula $H_2N-G-NH_2$ wherein G is the radical remaining after the removal of the amino groups of a long chain alkylene ether diamine. These polyether di-primary diamines are available commercially from the Texaco Chemical Company under the trademark Jeffamine. In general, they are prepared by known processes for the aminization of glycols.

The long-chain ether glycols suitable for use in the manufacture of the polyoxyalkylene diamines are polymeric glycols having terminal (or as nearly terminal as possible) hydroxy groups and a number average molecular weight of from about 600 to about 12000. Additionally, the long-chain ether glycols will have a carbon-to-oxygen ratio of from about 1.8:1 to about 4.3:1. Representative long chain ether glycols from which the polyoxyalkylene diamine is prepared include poly(ethylene ether)glycol, poly(propylene ether)glycol, poly(tetramethylene ether)glycol, random or block copolymers of ethylene oxide and propylene oxide, including propylene oxide terminated poly(ethylene ether)glycol, and random or block copolymers of tetrahydrofuran with minor amounts of a second monomer such as methyl tetrahydrofuran (used in proportion such that the carbon-to-oxygen mole ratio in the glycol does not exceed about 4.3). Especially preferred poly(alkylene ether)-glycols are poly(propylene ether) glycol, poly(tetramethylene ether)glycol and poly(ethylene ether)-glycols end-capped with poly(propylene ether)glycol and/or propylene oxide.

In general, the polyoxyalkylene diamines useful within the scope of the present invention will have an average molecular weight of from about 600 to 12000, preferably from about 900 to about 4000.

The tricarboxylic component (III)(a)(ii) may be a carboxylic acid anhydride containing an additional carboxylic group or the corresponding acid thereof containing two imide-forming vicinal carboxyl groups in lieu of the anhydride group. Mixtures thereof also are suitable. The additional carboxylic group must be esterifiable and preferably is substantially non-imidizable. The tricarboxylic acid component is present in amounts from about 10 to about 20 mole percent based on the moles of polyoxyalkylene diimide diacid.

While trimellitic anhydride is preferred as the tricarboxylic component, any of a number of suitable tricarboxylic acid constituents will occur to those skilled in the art including 2,6,7 naphthalene tricarboxylic anhydride; 3,3',4 diphenyl tricarboxylic anhydride; 3,3',4 benzophenone tricarboxylic anhydride; 1,3,4 cyclopentane tricarboxylic anhydride; 2,2',3 diphenyl tricarboxylic anhydride; diphenyl sulfone-3,3',4 tricarboxylic anhydride; ethylene tricarboxylic anhydride; 1,2,5 naphthalene tricarboxylic anhydride; 1,2,4 butane tricarboxylic anhydride; diphenyl isopropylidene 3,3',4 tricarboxylic anhydride; 3,4 dicarboxyphenyl 3'-carboxylphenyl ether anhydride; 1,3,4 cyclohexane tricarboxylic anhydride; etc. These tricarboxylic acid materials can be characterized by the following formula:

where R is a trivalent organic radical, preferably a $C_2$ to $C_{20}$ aliphatic, aromatic, or cycloaliphatic trivalent organic radical and R' is preferably hydrogen or a monovalent organic radical preferably selected from the group consisting of $C_1$ to $C_6$ aliphatic and/or cycloaliphatic radicals and $C_6$ to $C_{10}$ aromatic radicals, e.g. benzyl; most preferably hydrogen.

Briefly, these polyoxyalkylene diimide diacids may be prepared by known iridization reactions including melt synthesis or by synthesizing in a solvent system. Such reactions will generally occur at temperatures of from 100° C. to 300° C., preferably at from about 150° C. to about 250° C. while drawing off water or in a solvent system at the reflux temperature of the solvent or azeotropic (solvent) mixture.

Representative poly(oxyalkylene) glycols of component (IV) include those from which the polyoxyalkylene diamine is prepared, including poly(ethylene ether)-glycol, poly(propylene ether)glycol, poly(tetramethylene ether)glycol, random or block copolymers of ethylene oxide and propylene oxide, including propylene oxide terminated poly(ethylene ether)glycol. Preferred poly(alkylene ether)glycols are poly(propylene ether) glycol, poly(tetramethylene ether)glycol and poly-(ethylene ether)glycols end-capped with poly(propylene ether)glycol and/or propylene oxide. Most preferred is polyethylene glycol and polytetramethylene glycol. The average molecular weight of the poly(oxyalkylene) glycol component (IV) can vary widely, ranging from about 200 to about 12,000 with the range of about 400 to about 5000 being preferred.

The amount by which these reactants are employed and thus incorporated into the copolyetherimide ester component of the present invention is dependent to a large extent on the properties desired in the resultant polymer. Useful compositions in general are based on hardblock/softblock/glycol polymers containing from about 20 to about 90 weight % hardblock units, from about 5 to about 80 weight % softblock units and from about 0 to about 60 weight % glycol units. Preferred copolyetherimide esters contain from about 35 to about 85 weight % hardblock units, from about 5 to about 65 weight % softblock units and from about 0 to about 60 weight % glycol units.

In general, it is preferred that in the reaction mixture the low molecular weight diol be present in at least a molar equivalent amount, preferably a molar excess, most preferably at least 150 mole % based on the moles of dicarboxylic acid (II) and polyoxyalkylene diimide diacid (III) combined. Such molar excess of low molecular weight diol will allow for optimal yields, based on the amount of acids, while accounting for the loss of diol during esterification/condensation.

Further, while the weight ratio of dicarboxylic acid (II) to polyoxyalkylene diimide diacid (III) is not critical to form the copolyetherimide esters of the present invention, preferred compositions are those in which the weight ratio of the polyoxyalkylene diimide diacid (III) to dicarboxylic acid (II) is from about 0.20 to about 2.5, preferably from about 0.25 to about 2.0. The actual weight ratio employed will be dependent upon the specific polyoxyalkylene diimide diacid used and more importantly, the desired physical and chemical properties of the resultant copolyetherimide ester. In general, the lower the ratio of polyoxyalkylene diimide diester to dicarboxylic acid the better the strength, crystallization and heat distortion properties and thermal aging properties of the polymer. Alternatively, the higher the ratio, the better the flexibility, tensile strength and low temperature impact characteristics.

In preferred blends of the present invention, the copolyetherimide ester comprises the reaction product of dimethylterephthalate, optionally with up to 40 mole of another dicarboxylic acid; 1,4-butanediol, optionally with up to 40 mole % of another saturated or unsaturated aliphatic and/or cycloaliphatic diol; and a polyoxyalkylene diimide diacid prepared from a polyoxyalkylene diamine (i) of molecular weight of from about 600 to about 12000, preferably from about 900 to about 4000, and (ii) trimellitic anhydride. In its most preferred embodiments, the diol will be 100 mole % 1,4-butanediol and the dicarboxylic acid 100 mole % dimethylterephthalate.

The copolyetherimide esters described herein may be prepared by conventional esterification/condensation reactions for the production of polyesters as known in the art and described in the literature. Additionally, these compositions may be prepared by such processes and other known processes to effect random copolymers, block copolymers or hybrids thereof wherein both random and block units are present.

It is customary and preferred to utilize a catalyst in the production of the copolyetherimide esters. In general, any of the known ester-interchange and polycondensation catalysts may be used. Although two separate catalysts or catalyst systems may be used, one for ester interchange and one for polycondensation, it is preferred, where appropriate, to use one catalyst or catalyst system for both. In those instances where two separate catalysts are used, it is preferred and advantageous to render the ester-interchange catalyst ineffective following the completion of the precondensation reaction by means of known catalyst inhibitors or quenchers, in particular phosphorus compounds such as phosphoric acid, phosphenic acid, phosphonic acid and the alkyl or aryl esters or salts thereof, in order to increase the thermal stability of the resultant polymer.

Exemplary of the suitable known catalysts are the acetates, carboxylates, hydroxides, oxides, alcoholates or organic complex compounds of zinc, manganese, antimony, cobalt, lead, calcium and the alkali metals insofar as these compounds are soluble in the reaction mixture. Specific examples include zinc acetate, calcium acetate and combinations thereof with antimony trioxide and the like. These catalysts as well as additional useful catalysts are described in the literature.

Where the reactants and reactions allow, it is preferred to use the titanium catalysts including the inorganic and organic titanium-containing catalysts also described in the literature. Especially preferred are the organic titanates such as tetra-butyl titanate, tetra-isopropyl titanate and tetra-octyl titanate and the complex titanates derived from alkali or alkaline earth metal alkoxides and titanate esters, most preferably the organic titanates. These too may be used alone or in combination with other catalysts such as for example, zinc acetate, manganese acetate or antimony trioxide, and/or with a catalyst quencher as described above.

Although the polymer blends of the present invention possess improved thermal aging properties, it is preferred to further stabilize certain of the compositions to effects of heat, oxidation, UV light and the like. This can be accomplished by incorporating stabilizer materials (C) into the compositions either during production of the copolyetherimide esters or while in a hot melt stage following polymerization. The particular stabilizers useful herein are any of those known in the art which are suitable for copolyetherimide esters.

Satisfactory stabilizers include phenols and their derivatives, hindered amines and their derivatives, compounds containing both hydroxyl and amine groups, hydroxyamines, oximes, polymeric phenolic esters, epoxy resins and thioesters.

Representative phenol derivatives useful as stabilizers include 3,5-di-tert-butyl-4-hydroxy hydrocinnamic triester with 1,3,5-tris-(2-hydroxyethyl)-s-triazine-2,4,6-(1H,3H,5H)trione; 4,4'-bis(2,6-ditertiary-butylphenol); 1,3,5-trimethyl-2,4,6-tris(3,5-ditertiary-butyl-4-hydroxybenzyl)benzene and 4,4'-butylidene-bis(6-tertiary-butyl-m-cresol).

Preferred hindered phenols useful in this invention include 2,6-di-tert-butyl-4-methyl-phenol, commonly known as BHT (sold under the trade name Ional by Shell Chemical Co.); 4,4-methylene bis(2,6-di-tert-butylphenol) and 2,6-di-tert-butyl-4-n-butylphenol (sold under the trade name Ethyl 702 and Ethyl 744, respectively, by Ethyl Corp.); and tetrakis [methylene 3-(3',5'- di-tert-butyl-4'-hydroxyphenyl)propionate]methane and stearyl-3(3',5'-di-tert-butyl-4'hydroxyphenyl) propionate (sold under the trade name Irganox 1010 and Irganox 1076, respectively, by Ciba-Geigy).

Preferred epoxy resins include resins derived from an orthocresolformaldehyde novolac which then is reacted with epichlorohydrin to form a polyepoxide. Such resins are manufactured by Ciba-Geigy under the name "ECN" (epoxy cresol novolac) resins which have a reported average epoxy functionality of about 5.2. The preferred epoxy resin is ECN 1299 resin. This epoxy cresol novolac also has a reported epoxy functionality of about 5.2, i.e., the number of epoxy moieties per molecule. The epoxy resins employed as stabilizers in practicing this invention are not limited to this one epoxy type material. Other epoxies with a functionality greater than or equal to one will work. Additional preferred epoxy resins are the D.E.N. 400 series epoxy novolac resins manufactured by Dow Chemical such as D.E.N. 485 resin having an epoxy functionality of about 5.5, and bis aliphatic epoxies such as ERL 4221 from Union Carbide.

Typical amine stabilizers include N,N'-bis(β-naphthyl)-p-phenylene diamine; N,N'-bis(1-methylheptyl)-p-phenylene diamine and either phenyl-β-naphthyl amine or its reaction products with aldehydes. Additional stabilization to ultraviolet light can be obtained by compounding with various UV absorbers such as substituted benzophenones and/or benzotriazoles. A preferred stabilizer package for use in the blends of the present invention includes a hindered phenol, primary antioxidant and a secondary antioxidant comprising a mixture of phosphite, thioester and epoxy stabilizers.

Optionally, it may be desirable to add a minor amount, up to about 20 mole %, preferably up to about 10 mole %, based on the moles of the polyoxyalkylene diimide diacid, of a tricarboxylic component to the reaction mixture during separation of the copolyetherimide esters. While higher amounts of the tricarboxylic component may be used, this has the disadvantage of reducing some of the beneficial properties of the present polymers. Suitable tricarboxylic components are those identified above for the preparation of the polyoxyalkylene diimide diacid. While it is preferred that the additional tricarboxylic component be the same as that used in the preparation of the polyoxyalkylene diimide diacid, such is not necessary. The tricarboxylic acid component will tend to react with any residual, unreacted amine groups and, consequently, aid in the viscosity build of the polymer.

Further, the properties of these thermoplastic elastomers can be modified by incorporation of various conventional inorganic fillers (D) such as carbon black, silica gel, talc, clays and chopped or milled glass, or barium sulfate. These may be incorporated in amounts up to 50% by weight, preferably up to about 30% by weight. In general, these additives have the effect of increasing the modulus of the material at various elongations.

Polyamides suitable as component (B) for the preparation of the blends of the present invention may be obtained by polymerizing a monoamino-monocarboxylic acid having the general formula:

wherein R" is a straight or branched divalent aliphatic group having from 2 to about 16 carbon atoms; or an aromatic group having at least 6 carbon atoms; or a lactam thereof having the general formula:

wherein n is an integer of from 2 to about 11; or by polymerizing substantially equimolar proportions of a diamine, i.e., excess diamine is generally employed in the synthesis of amides, which contains at least 2 carbon atoms between the amino groups and a dicarboxylic acid; or by polymerizing a monoaminocarboxylic acid; or by polymerizing a monoaminocarboxylic acid, or a lactam thereof, as defined above, together with substantially equimolar proportions of a diamine and dicarboxylic acid. The dicarboxylic acid may be used in the form of a functional derivative thereof, for example, an ester or acid chloride. The term "substantially equimolar" proportions (of the diamine and of the dicarboxylic acid) is used to cover both strict equimolar proportions and slight departures therefrom which are involved in conventional techniques for stabilizing the viscosity of the resultant polyamides.

Examples of the aforementioned monoamino-monocarboxylic acids, or lactams thereof, which are useful in preparing the polyamides include those compounds containing from 2 to about 16 carbon atoms between the amino and carboxylic acid groups, the carbon atoms forming a ring with the —CO—NH group in the case of a lactam, as defined above. Some examples of aminocarboxylic acids and lactams used to practice this invention include, but are not limited to, aminocaproic acid, butyrolactam, pivalolactam, caprolactam, capryllactam, enantholactam, undecanolactam, dodecanolactam and 3- or 4-aminobenzoic acids.

Diamines suitable for use in the preparation of the polyamides include the straight chain and branched, alkyl, aryl and alkyl-aryl diamines. Such diamines include, for example, those represented by the general formula:

wherein n is an integer of from 2 to about 16, such as ethylenediamine, propylenediamine, tetramethylenediamine, pentamethylenediamine, hexamethylenediamine and the like. Also included are diamines such as 2-methylpentamethylenediamine, isomeric trimethylhexamethylenediamine, metaxylylenediamine, para-xylylenediamine, 1,3-bis(aminomethyl)cyclohexane, 1,4-bis(aminomethyl)cyclohexane, 1-3-diaminocyclohexane, 1,4-diaminocyclohexane, bis(4-aminocyclohexyl)methane, 2,2-bis(4-aminocyclohexyl) propane, 1-4-piperazine, meta-phenylenediamine, para-phenylenediamine, bis(4-aminophenyl)methane, and the like, or a mixture of any of the foregoing.

The dicarboxylic acids may be aromatic or aliphatic dicarboxylic acids of the formula:

wherein Z represents a divalent aliphatic group having from 2 to about 10 carbon atoms or an aromatic group having from 6 to about 10 carbon atoms. Examples of such acids are sebacic acid, suberic acid, azelaic acid, glutaric acid, pimelic acid, adipic acid, terephthalic acid, isophthalic acid and the like.

The polyamides described herein are either commercially available or can be produced by methods well known in the art.

The formulations of the heat stable blends of the present invention may vary widely depending upon the specific end-use application for the final composition. Generally, any combination of components (I) through (III) blended with component (B) can be employed. Optionally, components (I) through (III) can be reacted with a poly(oxyalkylene) glycol (IV). The preferred poly(oxyalkylene) glycol is polyethylene glycol within a molecular weight range of about 200 to about 4,000 or polytetramethylene glycol within a molecular weight range of about 800 to about 5,000. Where an inorganic filler component is employed, it should comprise no more than 50 parts and preferably no more than about 30 parts by weight of the total composition. Stabilizers are employed in conventional effective amounts.

The blends of the present invention comprise, in parts by weight, from about 50 to about 100 parts by weight of copolyetherimide ester resin (A), from about 0.1 to about 6 parts by weight of a polyamide (B), from 0 to about 50 parts by weight filler (D) and stabilizers (C) employed in conventional amounts. Preferred compositions are those having good flexibility (a characteristic imparted by the copolyetherimide ester resin) combined with good thermal aging performance (a quality imparted by the polyamides). Consequently, these preferred compositions comprise from about 90 to about 100 parts by weight resin (A), from about 3 to about 5 parts by weight of the polyamide (B) and an effective amount of a stabilizer package (C).

The polymer blends can further include rubbery modifiers (E). Examples of such rubbery modifiers include the olefinic rubbers such as polybutadiene, ethylene propylene, ethylene propylenediene and styrenebutadiene rubbers. Other suitable rubbery modifiers are disclosed in copending application Ser. No. 483,681. These rubbery modifiers can be added to a wide variety of compounds, and are employed in the polymer blends of the present invention in conventional, effective amounts.

The compositions of the present invention may be prepared by any of the well known techniques for preparing polymer blends or admixtures, with extrusion blending being preferred. Suitable devices for the blending include single screw extruders, twin screw extruders, internal mixers such as the Bambury Mixer, heated rubber mills (electric or oil heat) or Farrell continuous mixers. Injection molding equipment also can be used to accomplish blending just prior to molding, but care must be taken to provide sufficient time and agitation to insure uniform blending prior to molding.

Alternatively, the compositions of the present invention may be prepared by dry blending the components prior to extrusion or injection molding. Finally, any two or more of the components, preferably at least (B), can be pre-compounded prior to compounding with the copolyetherimide ester resin.

The polymer blends prepared in accordance with the present invention are suitable for a broad range of applications. These compositions manifest excellent physical attributes making them especially suited for applications requiring excellent stress-strength characteristics and thermal aging performance yet maintaining good flexibility.

The following examples illustrate present invention and are not to be construed as limiting thereto.

EXAMPLE 1

Eight separate Lomod ® A resin compositions (copolyetherimide ester comprising 54% softblock based on polypropyleneglycol diimide diacid and 46% hardblock units based on polybutylene terephthalate) were tested to determine the thermal aging performance of the compositions. The following nylon, stabilizers and rubber were blended with Lomod ® A in varying quantities by extrusion blending using a Werner Pflieder co-rotating 30mm twin screw extruder: Gelon A100, an amorphous nylon, (commercially available from General Electric Co.) also known as Nylon 6IT made of hexamethylenediamine at a nominal 40% by weight and isoterephthalate/terephthalate in a 65/35 ratio at a nominal 60% by weight; Irganox 1010, tetrakis [methylene (3,5-di-tert-butyl-4-hydroxyhydrocinnamate) methane], commercially available from Ciba Geigy Chemical Company; ECN 1299/ ethylene ethyl acrylate (EEA) (ECN 1299 obtained from Ciba Geigy), a multi-functional epoxy from the class of epoxy cresol novolac resins with a reported 5.2 epoxy functionality and having an ethylene ethyl acrylate resin as a carrier for the epoxy (the carrier helps in compounding the epoxy into the composition); Mark 2140, a thioester (obtained from Witco Chemical Corporation); Weston TNPP, a trisnonylphenyl phosphite (obtained from General Electric Co.); and the SBS rubber Kraton D1101 (an unsaturated styrene-butadiene-styrene triblock polymer made by Shell Oil Company). Barrel temperature settings were 400° F., 430° F., 430° F., 430° F., and 430° F. in zones 1, 2, 3, 4 and 5 respectively. The die temperature was set at 430° F. Screw speed was 300 rpm with a feed rate of 40 lbs/hour. Each of the eight compositions was formed into izod impact bars having dimensions of 0.125"×0.5"×2.5". A Van Dorn 80 ton injection molding press was used to make the izod bars. The barrel temperature settings were 420° F. with a 430° F. nozzle temperature. The mold temperature was set to 100° F., and screw speed was at 125 rpm. The primary pressure was 800 psi and secondary pressure was 500 psi. The primary inject time was 12 seconds with cool time in the mold being 18 seconds. The back pressure was set at 100 psi.

Table I discloses the composition of each of the eight samples. All the ingredients are designated in parts by weight. Each bar was put through a 180 degree bend test to determine the useful life of the polymer. Each bar was bent first in one direction until its ends touched, and then bent in the opposite direction until the ends touched again. If the bar broke during the procedure, it failed the 180 degree bend test. The bars were initially tested at room temperature. The bars were then placed in a Blue M hot forced air oven at 170° C. for 24 hours. The bars were supported by aluminum metal racks that held the bars at each end. After the bars were heated, they were allowed to cool for 0.5 hour at room temperature. The bars were then tested by bending each bar 180 degrees in both directions. The procedure was repeated employing heating intervals at 170° C. for 49 hours, 71 hours and 94 hours for different bars prepared from the same batch of material which passed the previous 180 degree bend test.

Table I shows the results obtained for each of the eight izod bars tested. Samples 1, 3, 5 and 7 which contained the nylon Gelon A100 passed the 180° bend test at 71 hours, while samples 4 and 8 which did not contain Gelon A100 failed the 180° bend test at 71 hours. This test thus demonstrated superior thermal aging performance of blends according to the present invention.

TABLE I

|  | 1 | 5 | 2 | 6 | 3 | 7 | 4 | 8 |
| --- | --- | --- | --- | --- | --- | --- | --- | --- |
| Lomod A | 100.00 | 100.00 | 100.00 | 100.00 | 100.00 | 100.00 | 100.00 | 100.00 |
| Irganox 1010 | 1.00 | 1.00 | 1.00 | 1.00 | 1.00 | 1.00 | 1.00 | 1.00 |
| ECN 1299/EAA Conc. | 2.00 | 2.00 | 2.00 | 2.00 | 2.00 | 2.00 | 2.00 | 2.00 |
| Mark 2140 | 0.15 | 0.15 | — | — | 0.15 | 0.15 | 0.15 | 0.15 |
| Weston TNPP | — | — | 0.15 | 0.15 | 0.15 | 0.15 | 0.15 | 0.15 |
| Gelon A100 | 5.00 | 5.00 | 5.00 | 5.00 | 5.00 | 5.00 |  |  |
| Kraton D1101 | 2.00 | 2.00 | 2.00 | 2.00 | 2.00 | 2.00 |  |  |
| Bend Test[a] 170C |  |  |  |  |  |  |  |  |
| Initial, No Heat | Pass | Pass | Pass | Pass | Pass | Pass | Pass | Pass |
| 24 Hours | Pass | Pass | Pass | Pass | Pass | Pass | Pass | Pass |
| 49 Hours | Pass | Pass | Pass | Pass | Pass | Pass | Pass | Pass |
| 71 Hours | Pass | Pass | Failed | Failed | Pass | Pass | Failed | Failed |
| 94 Hours | Failed | Failed | — | — | Failed | Failed | — | — |

[a]As described in Example 1

EXAMPLE 2

Figure 1:
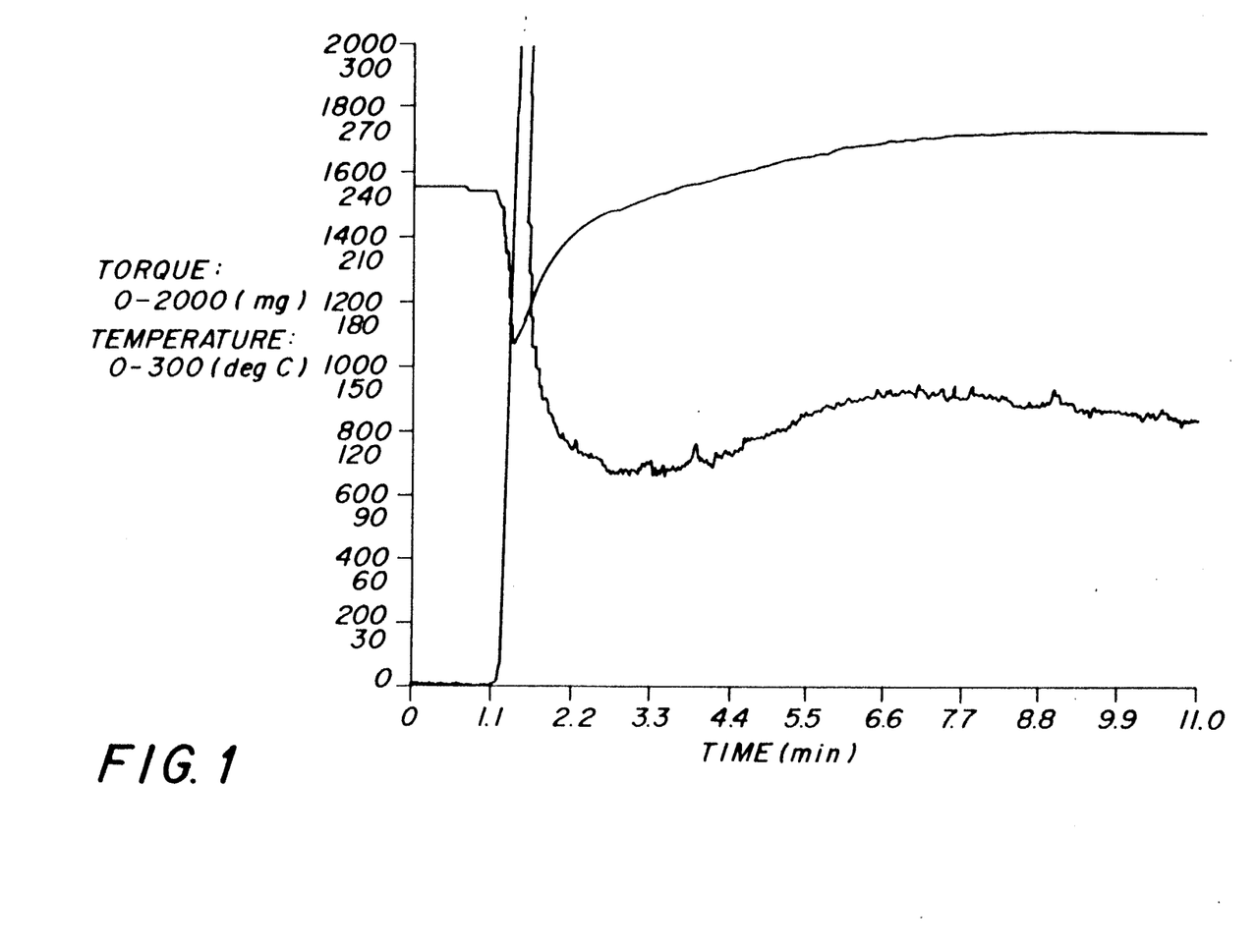
FIG. 1 illustrates the blending torque and temperature versus time of a blend of Lomod ® B (copolyether ester) resin and TGIC mixed on a Haake torque rheometer.
Figure 2:
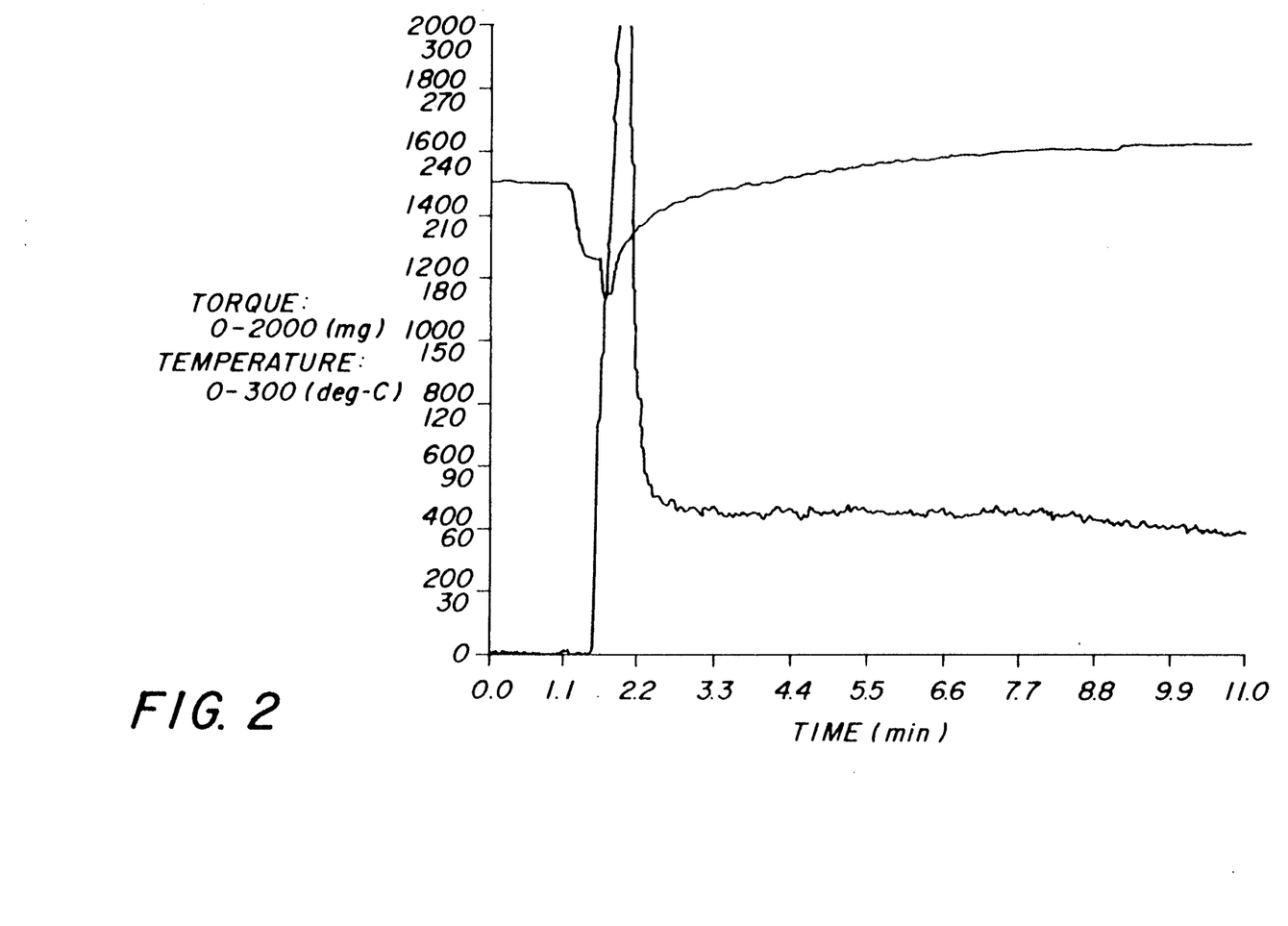
FIG. 2 illustrates the blending torque and temperature versus time of a blend of Lomod ® J (copolyetherimide ester) resin and TGIC mixed on a Haake torque rheometer.

Eight blends of Lomod ® A copolyetherimide ester (as described Example 1) with various combinations of the nylon, stabilizers and rubber of Example 1 were prepared according to the method of Example 1. Each izod impact bar was then put through the 180 degree bend test. Each bar was tested initially at room temperature prior to heating and then each bar was heated in a Blue M hot forced air oven at 170° C. at intervals of 24, 49, 71, 94 and 130 hours. After each heating interval, the bars were allowed to cool for 0.5 hour and then tested by the 180 degree bend test as performed in Example 1. The results of this test are disclosed in Table II. The test results show that Lomod ® A blends containing Gelon A100 (nylon 6IT) increase the thermal aging performance of Lomod ® resins as opposed to the blends without Gelon A100. For example, sample 6, which contained polyamide (Gelon A100), survived the bend test 1.5 days longer than sample 5 which did not contain polyamide. Sample 8 survived the bend test 1.5 days longer than sample 7. One Lomod ® A blend containing Gelon A100 managed to withstand fracture from the 180 degree bend test for over four days (sample 3, Table II). These results clearly show that blending polyamides with copolyesterimide ethers improve thermal aging performance in copolyesterimide ether resins.

resin (copolyetherimide ester resin with a softblock of polypropylene glycol diimide diacid and hard block of polybutylene terephthalate) were individually blended with triglycidyl isocyanurate (TGIC) a triazine-based additive in a ratio of 100:1.5 parts respectively. Each of the two compositions were dry blended and added separately to a Haake torque rheometer using a mixing bowl with roller blades where they were melt blended. FIGS. 1 and 2 illustrate the changes in melt viscosity during the melt mixing of the respective resins. Each figure illustrates a mixing bowl run plotting torque and temperature versus time. Torque is proportional to viscosity. Comparing the graphs of FIG. 1 and FIG. 2 it is clear that the melt viscosity of the Lomod ® B resin/TGIC blend was increased compared to the Lomod ® J resin/TGIC blend. The results show that it is not possible to assume that the incorporation of the same additive in chemically different materials, i.e., copolyetherimide ester resin versus copolyether ester resin, result in the same physical behavior for each of the resins.

We claim:

1. A stabilized thermoplastic elastomer composition comprising an admixture of
   (A) a copolyetherimide ester composition comprising the reaction product of
      (I) one or more low molecular weight diols;
      (II) one or more dicarboxylic acid components and
      (III) a member selected from the group consisting of
         (a)(i) one or more high molecular weight poly(oxyalkylene) diamines and
         (ii) one or more tricarboxylic acids and
         (b) one or more high molecular weight poly(oxyalkylene) diimide diacids; and
   (B) one or more polyamides.

TABLE II

|  | 1 | 2 | 3 | 4 | 5 | 6 | 7 | 8 |
| --- | --- | --- | --- | --- | --- | --- | --- | --- |
| Lomod A | 100 | 100 | 100 | 100 | 100 | 100 | 100 | 100 |
| Irganox 1010 | 1.0 | 1.0 | 1.0 | 1.0 | 0.1 | 0.1 | 1.0 | 1.0 |
| ECN 1299/EAA Conc. | 0.2 | 0.2 | 1.2 | 1.2 | 0.2 | 0.2 | 0.2 | 0.2 |
| Mark 2140 | 0.3 | 0.3 | 0.3 | 0.3 | 0.3 | 0.3 | 0.3 | 0.3 |
| Weston TNPP | 0.3 | 0.3 | 0.3 | 0.3 | 0.3 | 0.3 | 0.3 | 0.3 |
| Gelon A100 | 5.0 | 5.0 | 5.0 | 5.0 | 0 | 5.0 | 0 | 5.0 |
| Kraton D1101 | 0 | 2.0 | 0 | 2.0 | 2.0 | 2.0 | 2.0 | 2.0 |
| Days to failure by Bend Test | 4.0 | 3.5 | 5.5 | 3.0 | 1.5 | 3.0 | 2.5 | 4.0 |

EXAMPLE 3

Lomod ® B resin (copolyether ester resin with a soft block of polytetramethylene ether and hard block of polybutylene-hexylene terephthalate), and Lomod ® J 2. The composition of claim 1 wherein the low molecular weight diol component (I) comprises a $C_2$ to $C_{15}$ aliphatic or cycloaliphatic diol or a mixture thereof.

3. The composition of claim 2 wherein the low molecular weight diol component (I) comprises from about 60 to 100 mole % 1,4-butanediol.

4. The composition of claim 2 wherein the low molecular weight diol component (I) comprises from about 80 to 100 mole % 1,4-butanediol.

5. The composition of claim 2 wherein the low molecular diol component (I) consists essentially of 1,4-butanediol.

6. The composition of claim 1 wherein the dicarboxylic acid component (II) is selected from the group consisting of $C_4$ to $C_{16}$ aliphatic and/or cycloaliphatic dicarboxylic acid or a $C_6$ to $C_{16}$ aromatic dicarboxylic acid or the ester equivalents thereof and mixtures thereof.

7. The composition of claim 6 wherein the dicarboxylic acid component (II) comprises from about 60 to 100 mole % dimethyl terephthalate.

8. The composition of claim 6 wherein the dicarboxylic acid component (II) comprises from about 80 to 100 mole % dimethyl terephthalate.

9. The composition of claim 6 wherein the dicarboxylic acid component (II) consists essentially of dimethyl terephthalate.

10. The composition of claim 1 wherein the polyoxyalkylene diimide diacid component (III)(b) is derived from one or more polyoxyalkylene diamines and one or more tricarboxylic acid compounds containing two vicinal carboxyl groups or an anhydride group and an additional carboxyl group, and is characterized by the following formula:

wherein each R is independently selected from the group consisting of $C_2$ to $C_6$ aliphatic and cycloaliphatic trivalent organic radicals and $C_2$ to $C_{20}$ aromatic trivalent organic radicals; each R' is independently selected from the group consisting of hydrogen, $C_1$ to $C_6$ aliphatic and cycloaliphatic monovalent organic radicals and $C_6$ to $C_{10}$ aromatic monovalent organic radicals, and G is the radical remaining after removal of the hydroxy groups of a long chain ether glycol having an average molecular weight of from about 600 to 12000.

11. The composition of claim 10 wherein the polyoxyalkylene diimide diacid is such that each R is a $C_6$ trivalent aromatic hydrocarbon radical, each R' is hydrogen and G is the radical remaining after removal of the hydroxy groups of a long chain ether glycol having an average molecular weight of from about 900 to 4000.

12. The composition of claim 1 wherein the polyoxyalkylene diimide diacid is derived from trimellitic anhydride and a polyoxyalkylene diamine selected from the group consisting of polypropylene oxide diamine and copoly(ethylene oxide-propylene oxide)diamine having predominately polyethylene oxide in the backbone.

13. The composition of claim 1 wherein the polyoxyalkylene diimide diacid is derived from trimellitic anhydride and poly(tetramethylene ether)diamine.

14. The composition of claim 1 wherein the weight ratio of polyoxyalkylene diimide diacid to dicarboxylic acid is from about 0.20 to about 2.5.

15. The composition of claim 1 wherein the weight ratio of polyoxyalkylene diimide diacid to dicarboxylic acid is from about 0.25 to about 2.0.

16. The composition of claim 1 further comprising up to a minor amount of a tricarboxylic component selected from the group consisting of carboxylic acid anhydrides having an additional carboxyl group and tricarboxylic acid compounds having two vicinal carboxyl groups said tricarboxylic component being added to the reaction product of (I), (II) and (III) to react with any residual, unreacted amine groups.

17. The composition of claim 16 wherein the tricarboxylic component is characterized by the following formula:

where R is selected from the group consisting of $C_2$ to $C_{20}$ aliphatic and cycloaliphatic trivalent organic radicals and $C_6$ to $C_{20}$ aromatic trivalent organic radicals and R' is selected from the group consisting of hydrogen, $C_1$ to $C_6$ aliphatic and cycloaliphatic monovalent organic radicals and $C_6$ to $C_{10}$ aromatic monovalent organic radicals.

18. The composition of claim 16 wherein the tricarboxylic acid component is trimellitic anhydride.

19. The composition of claim 16 wherein the tricarboxylic component is present in an amount up to mole percent based on the moles of polyoxyalkylene diimide diacid.

20. The composition of claim 16 wherein the tricarboxylic compound is present in an amount up to 10 mole percent based on the moles of polyoxyalkylene diimide diacid.

21. The composition of claim 1 wherein the polyamide (B) comprises the polymerization product of
(a) a monoamino-monocarboxylic acid or lactams thereof;
(b) substantially equimolar proportions of a diamine and a dicarboxylic acid or a functional derivative thereof; or
(c) the monoamino-monocarboxylic acid or the lactam thereof and substantially equimolar proportions of the diamine and the dicarboxylic acid or a functional derivative thereof.

22. The composition of claim 21 wherein the monoamino-monocarboxylic acid comprises a compound having the general formula wherein R'' is a straight or branched divalent aliphatic group having from 2 to about 16 carbon atoms or an aromatic group having at least 6 carbon atoms.

23. The composition of claim 21 wherein the lactams have the structure wherein n is an integer from 2 to about 11.

24. The composition of claim 21 wherein the diamine includes the straight chain and branched alkyl, aryl and alkyl-aryl diamines having from 2 to about 16 carbon atoms.

25. The composition of claim 21 wherein the dicarboxylic acid is aromatic or aliphatic having the formula

HOOC—Z—COOH wherein Z represents a divalent aliphatic group having from 2 to about 10 carbon atoms or an aromatic group having from 6 to about 10 carbon atoms.

26. The composition of claim 1 wherein the polyamide comprises from about 0.1% to about 6% by weight of the stabilized thermoplastic elastomer.

27. The composition of claim 1 wherein the polyamide comprises from about 3% to about 5% by weight of the stabilized thermoplastic elastomer.

28. The composition of claim 1 wherein the copolyetherimide ester (A) further comprises a poly(oxyalkylene) glycol (IV).

29. The composition of claim 28 wherein the poly(oxyalkylene) glycol comprises one or more of poly(ethylene ether)glycol, poly(propylene ether)glycol, poly(tetramethylene ether)glycol or copoly(propylene ether-ethylene ether)glycol.

30. The composition of claim 1 wherein the copolyetherimide ester resin (A) comprises the reaction product of (I) 1,4-butanediol, (II) dimethylterephthalate, (III) a polyoxyalkylene diimide diacid derived from trimellitic anhydride and a polyoxyalkylene diamine having the formula:

H$_2$N—G—NH$_2$ wherein G is the divalent radical remaining after removal of the terminal hydroxyl groups of a long chain ether glycol having a molecular weight of from about 600 to about 12000.

31. The composition of claim 30 wherein the long chain ether glycol has a molecular weight of from about 900 to about 4000.

32. The composition of claim 30 wherein the long chain ether glycol comprises poly(tetramethylene ether)glycol or polypropylene ether glycol and further comprises co(polyethylene ether-propylene ether) glycol having a predominantly polyethylene ether backbone.

33. The composition of claim 30 wherein the long chain ether glycol comprises polypropylene ether 34. The composition of claim 30 further comprising 3,5-di-tert-butyl-4-hydroxy hydrocinnamic triester with 1,3,5-tris-(2-hydroxy-ethyl)-3-triazine-2,4,6-(1H,3H,5H)trione stabilizer (C).

35. The composition of claim 30 wherein a poly(oxyalkylene) glycol (IV) comprises a further reactant.

36. The composition of claim 35 wherein the poly(oxyalkylene)glycol component (IV) consists essentially of polyethylene glycol.

37. The composition of claim 35 wherein the poly(oxyalkylene)glycol component comprises polyethylene glycol.

38. The composition of claim 36 wherein the polyethylene glycol component has an average molecular weight of from about 200 to about 4000.

39. The composition of claim 37 wherein the polyethylene glycol component has an average molecular weight of from about 200 to about 4000.

40. The composition of claim 35 wherein the poly(oxyalkylene)glycol component consists essentially of polytetramethylene glycol.

41. The composition of claim 35 wherein the poly(oxyalkylene)glycol component comprises polytetramethylene glycol.

42. The composition of claim 40 wherein the polytetramethylene glycol component has a molecular weight of from about 400 to about 12,000.

43. The composition of claim 41 wherein the polytetramethylene component has a molecular weight of from about 800 to about 5,000.

44. The composition of claim 1 further comprising a stabilizer (C) wherein the stabilizer (C) comprises one or more of a hindered phenol, phenol derivative, amine, epoxy resin or thioester.

45. The composition of claim 1 further comprising a filler (D) wherein the filler (D) comprises one or more carbon black, silica gel, clay, chopped or milled glass, talc, or barium sulfate.

46. The composition of claim 1 wherein the polyamide is amorphous.

* * * * *